US012802124B2

(12) United States Patent
Honeywell

(10) Patent No.: US 12,802,124 B2
(45) Date of Patent: Nov. 17, 2026

(54) FINANCIAL TRANSACTION SYSTEM AND METHOD

(71) Applicant: Sean William Honeywell, Durban (ZA)

(72) Inventor: Sean William Honeywell, Durban (ZA)

( * ) Notice: Subject to any disclaimer, the term of this patent is extended or adjusted under 35 U.S.C. 154(b) by 0 days.

(21) Appl. No.: 17/416,292

(22) PCT Filed: Dec. 18, 2019

(86) PCT No.: PCT/IB2019/061015
§ 371 (c)(1),
(2) Date: Jun. 18, 2021

(87) PCT Pub. No.: WO2020/128895
PCT Pub. Date: Jun. 25, 2020

(65) Prior Publication Data

US 2022/0067824 A1 Mar. 3, 2022

(30) Foreign Application Priority Data

Dec. 18, 2018 (ZA) ................................ 2018/08490
May 31, 2019 (ZA) ................................ 2019/03489

(51) Int. Cl.
*G06Q 20/10* (2012.01)
*G06Q 20/02* (2012.01)
(Continued)

(52) U.S. Cl.
CPC ........... *G06Q 40/02* (2013.01); *G06Q 20/023* (2013.01); *G06Q 20/108* (2013.01); *G06Q 30/016* (2013.01); *G06Q 40/125* (2013.12)

(58) Field of Classification Search
CPC .... G06Q 40/02; G06Q 20/023; G06Q 20/108; G06Q 30/016; G06Q 40/125
(Continued)

(56) References Cited

U.S. PATENT DOCUMENTS 9,990,613 B1 6/2018 Bhatt et al.
10,636,035 B1 * 4/2020 Matson ............... G06Q 20/202
(Continued)

FOREIGN PATENT DOCUMENTS

CN 103475623 A * 12/2013
WO 2016030862 A1 3/2016
(Continued)

OTHER PUBLICATIONS

International Searching Authority, International Search Report and Written Opinion, mailed in relationship to International Application No. PCT/IB2019/061015, mailed Jun. 25, 2020.
(Continued)

*Primary Examiner* — Ambreen A. Alladin
(74) *Attorney, Agent, or Firm* — Vani Moodley, Esq.

(57) ABSTRACT

The invention relates to a method of facilitating a financial transaction between a payer and beneficiary, the method including receiving, from the beneficiary, by at least one processor, an expedite clearance request message for expediting the transfer and clearance of money that is being transferred into a financial account of the beneficiary at a financial institution associated with the beneficiary from a payer financial account at a financial institution associated with the payer; and clearing, by the at least one processor, the money into the beneficiary financial account in an expedited fashion in response to receiving the expedite clearance request message. The invention also relates to a system for, and a computer readable device containing instructions which can be executed by a processor for, carrying out the method of the present invention.

17 Claims, 5 Drawing Sheets

(51) Int. Cl.
*G06Q 30/016* (2023.01)
*G06Q 40/02* (2023.01)
*G06Q 40/12* (2023.01)

(58) Field of Classification Search
USPC .............................................................. 705/42
See application file for complete search history.

(56) References Cited

U.S. PATENT DOCUMENTS

| | | | |
|---|---|---|---|
| 2009/0198619 A1 | 8/2009 | Tripunitara et al. | |
| 2015/0112866 A1* | 4/2015 | Muthu ................. | G06Q 20/385<br>705/44 |
| 2017/0357966 A1 | 12/2017 | Chandrasekhar et al. | |

FOREIGN PATENT DOCUMENTS

| | | |
|---|---|---|
| WO | 2016202952 A1 | 12/2016 |
| WO | 2020028626 A1 | 2/2020 |

OTHER PUBLICATIONS

Ghada Almashaqbeh et al: "MicroCash: Practical Concurrent Processing of Micropayment s", Arxiv.Org. Cornell University Library . 201 Olin Library Cornell University Ithaca, NY 14853, Nov. 19, 2019, XP081535876.
ARIPO Search Report: AP/P/2024/015480 dated 2026-04-29.

* cited by examiner

FINANCIAL TRANSACTION SYSTEM AND METHOD

FIELD OF INVENTION

THIS invention relates to a financial transaction system and a method of operating a financial transaction system, in particular with respect to the transfer of funds between a payer bank and payee/beneficiary bank. The invention also extends to a method of, and system for, processing a payment to a beneficiary.

BACKGROUND OF INVENTION

There are currently millions of transactions taking place on a daily basis with Electronic Funds Transfers (EFT) being the second most popular online payment method in South Africa after debit and credit cards transactions. It is a reality across all platforms of Electronic Banking that bank-to-bank (not within the same bank but rather between different banks) transactions often encounter a delay from the time of a payment from a payer account of a payer at the payer's bank to the time of clearance to a beneficiary account of a beneficiary of said payment at the beneficiary's bank.

An immediate clearance option has provided the payer/sender (but not the recipient/beneficiary) with an option to pay an additional fee for immediate clearance to the beneficiary. This has become a huge income stream for financial institutions but has no direct financial benefit to the payer/sender and is a contradiction in its logic in that the sender fits the bill for the convenience of the beneficiary receiving the transferred funds immediately.

In an event that the payer refuses to bear the immediate clearance cost, the beneficiary would have to wait for clearance of the funds in respect of payment. It can typically take around 1 to 3 days for the funds to reflect in the beneficiary's bank account. This is problematic especially if the beneficiary is relying on receipt of funds for certain financial obligations.

It is accordingly the object of the present invention to provide a financial transaction system and method which will ameliorate some of the drawbacks associated with the traditional methods of clearing funds into the beneficiary's bank/financial account. For ease of explanation, it will be appreciated that the terms "money" and "funds" are used interchangeably herein; the terms "payer", "sender", "transferrer" are used interchangeably herein; the terms "payment", "transfer" are used interchangeably herein; and the terms "beneficiary", "recipient", and "transferee" are also used interchangeably herein.

SUMMARY OF INVENTION

According to a first aspect of the invention, there is provided a computer-implemented method of facilitating a financial transaction between a payer and beneficiary, the method including:

- receiving, from the beneficiary, by at least one processor, an expedite clearance request message for expediting the transfer and clearance of money that is being transferred into a financial account of the beneficiary at a financial institution associated with the beneficiary from a payer financial account at a financial institution associated with the payer; and
- clearing, by the at least one processor, the money into the beneficiary financial account in an expedited fashion in response to receiving the expedite clearance request message.

It will be appreciated that phrase "expedited fashion" relates to the transfer and clearance of money immediately or substantially in real-time. The word "money" refers to any medium of exchange, including, but not limited to, conventional currency, virtual currency, cryptocurrency or any credit or rewards points that can be transferred from the payer to the beneficiary via a financial account associated with the beneficiary.

In an embodiment, the method may comprise deducting, by at least one processor, a service charge fee associated with the request of expedited clearance. The service charge fee may be deducted from the beneficiary's financial account and/or the money that is being immediately transferred into the beneficiary's financial account. In one version, the service charge fee may accumulate over a period of time (monthly, typically) and then be deducted from the beneficiary's financial account. In respect of all these deduction options, the at least one processor prompts the beneficiary to specify the preferred option (or combination of options). In one version, the service charge fee may be absorbed by the financial institution associated with the beneficiary.

In an embodiment, the step of receiving the expedite clearance request message may be preceded by the step of receiving, by the beneficiary, a transfer notification message indicating that money is being transferred into or is about to be transferred into the beneficiary's financial account.

In an embodiment, the received transfer notification message may comprise information pertaining to the fee that will be charged for expediting the clearance of the money into the beneficiary's bank account and associated terms and conditions.

The transfer notification message may prompt the beneficiary for a selection of expedited clearance as described herein, wherein in response to a positive selection of expedited clearance from the user, the expedite clearance request message is generated and transmitted to the at least one processor.

In one version, the at least one processor prompts the beneficiary to agree to the deduction of the service charge fee (to secure the required contractual agreement with the beneficiary). In this version, the financial institution associated with the payer may be instructed by the at least one processor to delay the transfer of money into the beneficiary financial account, pending confirmation from the beneficiary that the service charge fee may be deducted. Upon receiving agreement that the service charge fee may be deducted, the at least one processor proceeds to clear and transfer the money into the beneficiary financial account in an expedited fashion, as defined above.

In one version, the transfer notification message may comprise a permission notification message in the event that the beneficiary is added as a beneficiary on the payer financial account and/or payroll of the payor, wherein the permission notification is for prompting the beneficiary to opt between accepting or declining future clearances of all monies which the payer intends to transfer to the beneficiary in the future, so as to permit the clearance of the money which is to be transferred in the future to occur automatically in an expedited fashion as described herein.

In an embodiment, the permission notification may comprise of terms and conditions associated with the service for expedited clearance of the funds.

In an embodiment, instead of receiving the expedite clearance request message, the method may comprise the step of receiving, from the beneficiary, by means of at least one processor, an expedited clearance decline request for disallowing the expedited/immediate clearance of the money, so as to allow the transfer of the money and eventual clearance thereof from the payer financial account into the beneficiary financial account to occur in a period regulated by either the payer or beneficiary banks or entities with which the payor and beneficiary have financial accounts with.

In an embodiment, the steps of receiving of the transfer notification message, receiving of the expedite clearance request message, receiving of the expedited clearance decline request, and transferring and clearance of the money into the beneficiary financial account, may occur substantially in real time.

The messages received from or transmitted to the beneficiary may be to a suitable computing device associated with the beneficiary. To this end, the messages may be in the form of USSD (Unstructured Supplementary Service Data) messages, SMS (Short Message Service) messages, notifications on a mobile software application ('app') or the like.

According to a second aspect of the invention, there is provided a financial transaction system comprising:

at least one processor; and a memory device containing instructions which when executed cause the processor to:

receive from a beneficiary, an expedite clearance request message for expediting the clearance of money that is being transferred into a financial account of the beneficiary at a financial institution associated with the beneficiary from a payer financial account at a financial institution associated with the payer; and clear the transferred money into the beneficiary financial account in an expedited fashion in response to receiving the expedite clearance request message.

In an embodiment, the memory may further contain instructions which when executed cause the processor to deduct a service charge fee associated with the request of expedited clearance. The service charge fee may be deducted from the beneficiary's financial account and/or the money that is being immediately transferred into the beneficiary's financial account. In one version, the service charge fee may accumulate over a period of time (monthly, typically) and then be deducted from the beneficiary's financial account. In respect of all these deduction options, the at least one processor prompts the beneficiary to specify the preferred option (or combination of options). In one version, the service charge fee may be absorbed by the financial institution associated with the beneficiary.

In an embodiment, the causing of the processor to receive the expedite clearance request message may be in response to a transfer notification message transmitted to the beneficiary indicating that money is being transferred into or is about to be transferred into the beneficiary's financial account.

In an embodiment, the received transfer notification message may comprise information pertaining to the fee that will be charged for expediting the clearance of the money into the beneficiary's financial account and associated terms and conditions.

The transfer notification message may prompt the beneficiary for a selection of expedited clearance as described herein, wherein in response to a positive selection of expedited clearance from the user, the expedite clearance request message is generated and transmitted to the at least one processor.

In one version, the beneficiary is prompted to agree to the deduction of the service charge fee (to secure the required contractual agreement with the beneficiary). In this version, the financial institution associated with the payer may delay the transfer of money into the beneficiary financial account, pending confirmation from the beneficiary that the service charge fee may be deducted. Upon receiving agreement that the service charge fee may be deducted, the processor is instructed to proceed to clear and transfer the money into the beneficiary financial account in an expedited fashion, as defined above.

In one version, the transfer notification message may comprise a permission notification in the event that the beneficiary is added as a beneficiary on the payroll and/or financial account of the payor, wherein the permission notification presents the beneficiary with an option to accept or decline future clearance of all monies which the payer intends to transfer to the beneficiary in an expedited manner as described herein, so as to permit the clearance of the transferred money to occur automatically on future dates on which the transfer of money will take place in an expedited manner as described herein.

In an embodiment, the permission notification may comprise of terms and conditions associated with the service for expedited clearance of the funds.

In an embodiment, instead of receiving the expedite clearance request message, the memory may contain instructions which when executed causes the processor to receive, from the beneficiary, an expedited clearance decline request for disallowing the immediate/expedited transfer and clearance of the money, so as to allow the transfer and clearance of the money from the payer's financial account into the beneficiary's financial account to occur in a period regulated by either the payer or beneficiary banks.

In an embodiment, the causing of the processor to receive the transfer notification message, receive the expedite clearance request message, receive the expedite clearance decline request, and transfer and clear the money into the beneficiary bank account, may occur substantially in real time.

The messages received from or transmitted to the beneficiary may be to a suitable computing device associated with the beneficiary. To this end, the messages may be in the form of USSD (Unstructured Supplementary Service Data) messages, SMS (Short Message Service) messages, notifications on a mobile software application ('app') or the like.

According to a third aspect of the invention, there is provided a non-transitory computer-readable storage device storing at least one set of computer executable instructions which when executed by at least one processor of a computer causes the computer to:

receive from a beneficiary, an expedite clearance request message for expediting the clearance of money that is being transferred into a financial account of the beneficiary at a financial institution associated with the beneficiary from a payer financial account at a financial institution associated with the payer; and clear the transferred money into the beneficiary financial account in an expedited fashion in response to receiving the expedite clearance request message.

According to a fourth aspect of the invention, there is provided a computer-implemented method of processing a payment to a beneficiary, the method including:

receiving, by at least one processor at a financial institution associated with the beneficiary, a payment transfer message indicating that money is being transferred into or is about to be transferred into a financial account of the beneficiary;

sending, by the at least one processor, a payment notification message to the beneficiary indicating the imminent transfer of money, the payment notification message allowing the beneficiary to send an expedite clearance request message to the financial institution associated with the beneficiary, for expediting the transfer and clearance of money that is being or about to be transferred into the beneficiary's financial account;

receiving, from the beneficiary, by the at least one processor, the expedite clearance request message for expediting the transfer and clearance of the money; and clearing, by the at least one processor, the money into the beneficiary financial account in an expedited fashion in response to receiving the expedite clearance request message.

It will be appreciated that phrase "expedited fashion" relates to the transfer and clearance of money immediately or substantially in real-time.

In an embodiment, the step of sending the payment notification message may involve the involvement of a call centre agent to contact the beneficiary to alert him/her of the imminent transfer of money, with the expedite clearance request message then taking the form of a verbal confirmation by the beneficiary. In one version, this process may be managed by an interactive voice response system, with voice prompts being generated and provided to the beneficiary, who can in turn respond using the keypad of an electronic device associated with the beneficiary.

In an embodiment, the payment notification message may comprise information pertaining to the fee that will be charged for expediting the clearance of the money into the beneficiary's bank account and associated terms and conditions.

The payment notification message may prompt the beneficiary for a selection of expedited clearance as described herein, wherein in response to a positive selection of expedited clearance from the user, the expedite clearance request message is generated and sent back to the at least one processor.

In an embodiment, the method may comprise deducting, by at least one processor, a service charge fee associated with the request of expedited clearance. The service charge fee may be deducted from the beneficiary's financial account and/or the money that is being immediately transferred into the beneficiary's financial account. In one version, the service charge fee may accumulate over a period of time (monthly, typically) and then be deducted from the beneficiary's financial account. In respect of all these deduction options, the at least one processor prompts the beneficiary to specify the preferred option (or combination of options). In one version, the service charge fee may be absorbed by the financial institution associated with the beneficiary.

In one version, the at least one processor prompts the beneficiary to agree to the deduction of the service charge fee (to secure the required contractual agreement with the beneficiary). In this version, upon receiving confirmation from the beneficiary that the service charge fee may be deducted, the at least one processor proceeds to clear and transfer the money into the beneficiary financial account in an expedited fashion, as defined above, or in good faith in advance of the money being received.

According to a fifth aspect of the invention, there is provided a payment processing system for processing a payment to a beneficiary, the system comprising:

at least one processor; and a memory device containing instructions which when executed cause the processor to:

receive, by a financial institution associated with the beneficiary, a payment notification message indicating that money is being transferred into or is about to be transferred into a financial account of the beneficiary;

send a payment notification message to the beneficiary indicating the imminent transfer of money, the payment notification message allowing the beneficiary to send an expedite clearance request message to the financial institution associated with the beneficiary, for expediting the transfer and clearance of money that is being or about to be transferred into the beneficiary's financial account;

receive, from the beneficiary, the expedite clearance request message for expediting the transfer and clearance of the money; and clear the money into the beneficiary financial account in an expedited fashion in response to receiving the expedite clearance request message.

According to a sixth aspect of the invention, there is provided a non-transitory computer-readable storage device storing at least one set of computer executable instructions which when executed by at least one processor of a computer causes the computer to:

receive, by a financial institution associated with the beneficiary, a payment notification message indicating that money is being transferred into or is about to be transferred into a financial account of the beneficiary;

send a payment notification message to the beneficiary indicating the imminent transfer of money, the payment notification message allowing the beneficiary to send an expedite clearance request message to the financial institution associated with the beneficiary, for expediting the transfer and clearance of money that is being or about to be transferred into the beneficiary's financial account;

receive, from the beneficiary, the expedite clearance request message for expediting the transfer and clearance of the money; and clear the money into the beneficiary financial account in an expedited fashion in response to receiving the expedite clearance request message.

DETAILED DESCRIPTION OF AN EXAMPLE EMBODIMENT

The following description of the invention is provided as an enabling teaching of the invention. Those skilled in the relevant art will recognise that many changes can be made to the embodiment described, while still attaining the beneficial results of the present invention. It will also be apparent that some of the desired benefits of the present invention can be attained by selecting some of the features of the present invention without utilising other features. Accordingly, those skilled in the art will recognise that modifications and adaptations to the present invention are possible and can even be desirable in certain circumstances and are a part of the present invention. Thus, the following description is provided as illustrative of the principles of the present invention and not a limitation thereof.

It will be appreciated that the phrase "for example," "such as", and variants thereof describe non-limiting embodiments of the presently disclosed subject matter. Reference in the specification to "one example embodiment", "another example embodiment", "some example embodiment", or variants thereof means that a particular feature, structure or characteristic described in connection with the embodiment (s) is included in at least one embodiment of the presently disclosed subject matter. Thus, the use of the phrase "one example embodiment", "another example embodiment", "some example embodiment", or variants thereof does not necessarily refer to the same embodiment(s).

Unless otherwise stated, some features of the subject matter described herein, which are, described in the context of separate embodiments for purposes of clarity, may also be provided in combination in a single embodiment. Similarly, various features of the subject matter disclosed herein which are described in the context of a single embodiment may also be provided separately or in any suitable sub-combination.

Figure 1:
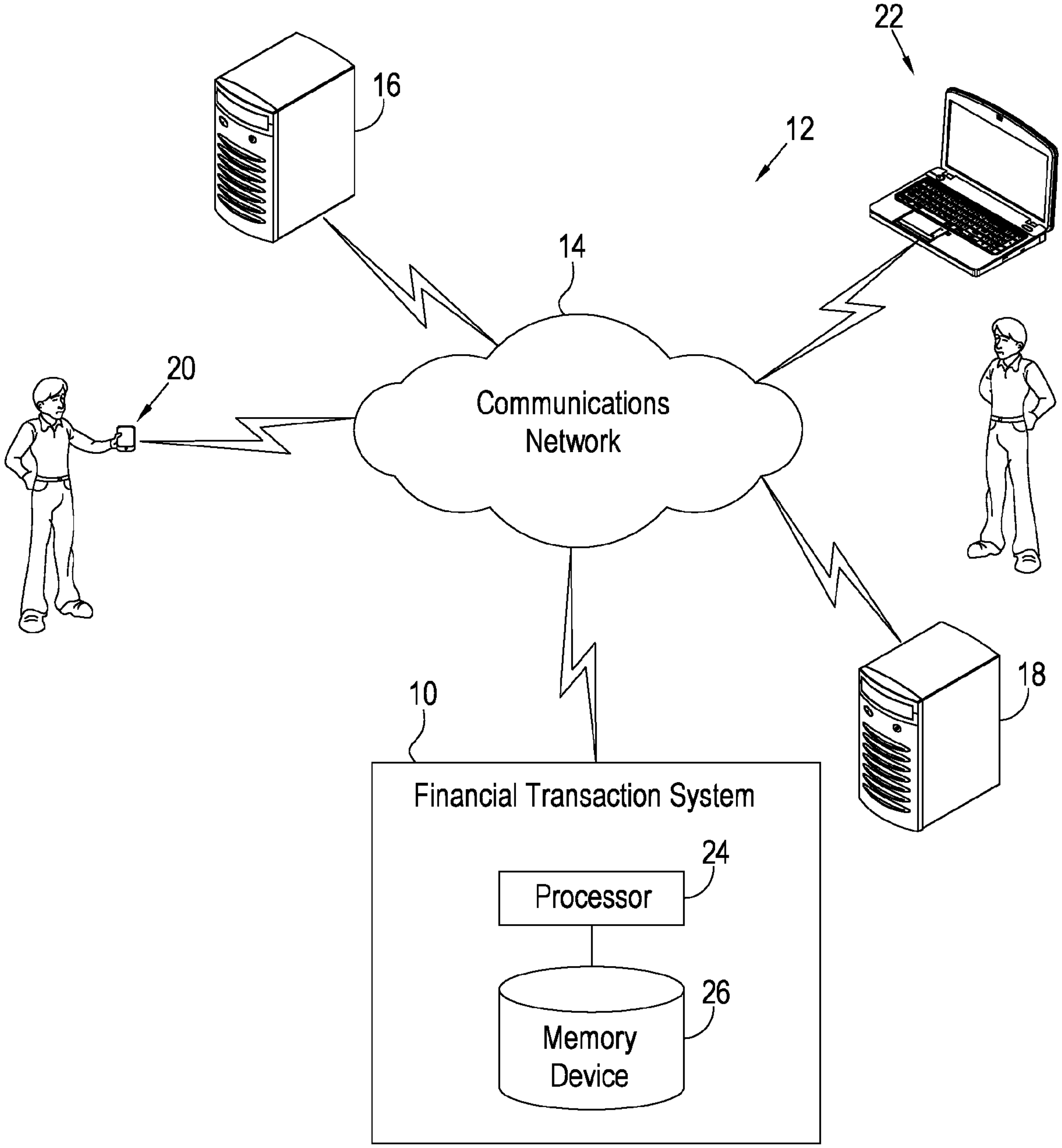
FIG. 1 shows a schematic diagram of a network incorporating a financial transaction system in accordance with an example embodiment of the invention.

Referring to FIG. 1 of the drawings, a network 12 incorporating a system 10 in accordance with an example embodiment of the invention is generally indicated by reference number 10. The system 10 is typically a financial transaction system 10 configured to facilitate a payment transaction for the transfer of funds from a financial institution associated with a payer of funds to a financial institution associated with a beneficiary of funds in substantially an electronic manner. For ease of explanation, the transfer of funds contemplated in the manner described above will be simply referred to as the transfer of funds from the payer to the beneficiary as is colloquially understood.

To this end, the system 10 is typically communicatively coupled to a bank server A 16 associated with the bank of the beneficiary of funds, as well as a bank server B 18 associated with the bank of the payer of funds via a suitable communication network 14. Moreover, the system 10 may be in communication with suitable computing devices associated with the beneficiary of funds and the payer of funds, for example, endpoint computing devices 20, and 22 associated with the beneficiary and payer respectively also via the network 14.

The communications network 14 may comprise one or more different types of communication networks. In this regard, the communication networks may be one or more of the Internet, a local area network (LAN), a wide area network (WAN), a metropolitan area network (MAN), various types of telephone networks (e.g., Public Switch Telephone Networks (PSTN) with Digital Subscriber Line (DSL) technology) or mobile networks (e.g., Global System Mobile (GSM) communication, General Packet Radio Service (GPRS), Code Division Multiple Access (CDMA), and other suitable mobile telecommunication network technologies), or any combination thereof. It will be noted that communication within the network may achieved via suitable wireless or hard-wired communication technologies and/or standards (e.g., wireless fidelity (Wi-Fi®), 4G, long-term evolution (LTE™), WiMAX, 5G, and the like). In some example embodiments, the system 10 may be coupled to other elements of the network 12 via dedicated communication channels, for example, secure communication networks in the form of encrypted communication lines (e.g. SSL (Secure Socket Layer) encryption). The latter may be the case with the system 10 being communicatively coupled to the bank server A 16 and bank server B 18.

The endpoint beneficiary and payer computing devices 20, 22, or any computing device contemplated herein, may comprise one or more computer processors and a computer memory (including transitory computer memory and/or non-transitory computer memory), configured to perform various data processing operations. The devices 20,22 also include a network communication interface (not shown) to connect to the system 10 via the network 14. Examples of the devices represented by the devices 20, 22 may be selected from a group comprising a personal computer, portable computer, smartphone, tablet, notepad, dedicated server computer devices, any type of communication device, and/or other suitable computing devices. It will be appreciated that in some example embodiments, the devices 20, 22 may be connected to network 14 via an intranet, an Internet Service Provider (ISP) and the Internet, a cellular network, and/or other suitable network communication technology.

It will be noted that though multiple bank servers may be in communication with system 10, only two are illustrated for convenience. The same applies to the beneficiary and payer devices 20, 22.

The bank server A 16 and bank server B 18 may comprise more than one servers, which may be geographically distributed, for example, across the network 12 in a cloud computing-based fashion. The bank servers A 16 and B 18 may effectively hold bank accounts for the beneficiary and payer respectively in a conventional fashion. To this end, in some example embodiments where the beneficiary and the payer are part of the same bank, the bank server A 16 and the bank server B 18 are the same.

Moreover, though reference will be made to the beneficiary and payer, it will be appreciated that depending on the transaction, the roles may be reversed as will be understood by those skilled in the art wherein the beneficiary may also be a payer as contemplated herein, and vice versa.

The system 10 may therefore be in the form of a stand-alone clearing system similar those conventionally in existence which effectively clears transactions between the banks associated with beneficiaries and payers. However, it will be appreciated that in some example embodiments, the system 10 may form part of either bank server A 16 or bank server B, or both.

Alternately, the system 10 may be a stand-alone system which is merely communicatively coupled to an intermediary conventional bank clearing house system/server which clears transactions between banks in a conventional fashion.

Like the bank servers A 16 and B 18, the system 10 is typically embodied in one or more servers which are operatively communicatively connected to the network 14 by suitable network interface/s. Though one server is illustrated in respect of the system 10, it will be appreciated that the system 10 may be incorporated in one or a plurality of networked servers spread out locally and/or geographically through the network 14, for example, in a cloud-based computing like fashion.

Though not illustrated, it will be understood that the system 10 may include one or more of a back-end (e.g., a data server), a middleware (e.g., an application server), and a front-end (e.g., a client computing device having a graphical user interface (GUI) or a Web browser through which a user can interact with example implementations of the subject matter described herein).

The system 10, particularly the one or more servers of the system 10, may include a processor 24 and memory device 26 (including transitory computer memory and/or non-transitory computer memory), which are configured to perform various data processing and communication operations associated with the system 10 as contemplated herein.

The processor 24 may be one or more processors in the form of programmable processors executing one or more computer programs to perform actions by operating on input data and generating output. The processor 24, as well as any computing device referred to herein, may be any kind of electronic device with data processing capabilities including, by way of non-limiting example, a general processor, a graphics processing unit (GPU), a digital signal processor (DSP), a microcontroller, a field programmable gate array (FPGA), an application specific integrated circuit (ASIC), or any other electronic computing device comprising one or more processors of any kind, or any combination thereof. For brevity, steps described as being performed by the system 10 may be steps which are effectively performed by the processor 24 and vice versa unless otherwise indicated.

It will be appreciated that the memory device 26 may be a database. The memory device 26 may be in the form of computer-readable medium including system memory and including random access memory (RAM) devices, cache memories, non-volatile or back-up memories such as programmable or flash memories, read-only memories (ROM), etc. In addition, the memory device 26 may be considered to include memory storage physically located elsewhere in the system 10, e.g. any cache memory in the processor 24 as well as any storage capacity used as a virtual memory, e.g., as stored on a mass storage device.

Though not illustrated, it will be appreciated that the system 10 may comprise one or more user input devices (e.g., a keyboard, a mouse, imaging device, scanner, microphone) and a one or more output devices (e.g., a Liquid Crystal Display (LCD) panel, a sound playback device (speaker), switches, valves, etc.).

It will be appreciated that the computer programs executable by the processor 24 may be written in any form of programming language, including compiled or interpreted languages, declarative or procedural languages, and can be deployed in any form, including as a stand-alone program or as a module, component, subroutine, object, or other unit suitable for use in a computing environment. The computer program may, but need not, correspond to a file in a file system. The program can be stored in a portion of a file that holds other programs or data (e.g., one or more scripts stored in a mark-up language document), in a single file dedicated to the program in question, or in multiple coordinated files (e.g., files that store one or more modules, sub-programs, or portions of code). The computer program can be deployed to be executed by one processor 24 or by multiple processors 24, even those distributed across multiple locations, for example, in different servers and interconnected by the communication network 14.

The computer programs may be stored in the memory device 26 or in memory provided in the processor 24. Though not illustrated or discussed herein, it will be appreciated by those skilled in the field of invention that the system 10 may comprise a plurality of logic components, electronics, driver circuits, peripheral devices, etc. not described herein for brevity.

As mentioned above, the system 10, particularly the processor 24, is configured to facilitate processing a transaction from the payer to the beneficiary, particularly clearing of the transaction for payment of funds from the payer to the beneficiary.

In this regard, the processor 24 is configured to receive a suitable message, for example, via the network 14, indicating that the payer, from their associated bank account, is to be paying a predetermined amount of funds to the beneficiary, particularly the beneficiary bank account. Differently stated, the processor 24 may be configured to receive a suitable message indicating that money is being transferred into or is about to be transferred into the beneficiary's financial account. Depending on the configuration of the implemented system 10, it will be appreciated that the suitable message may be received from one or more of the bank server A 16, bank server B 18, the device 22, the device 20, or the stand-alone clearing house system previously mentioned (not illustrated). Notwithstanding, for ease of explanation, the invention will be described with the suitable message being received by the processor 24 from the bank server B 18 associated with the bank of the payer. The suitable message may comprise details of the proposed transfer of funds including the amount being transferred, payer details, and beneficiary details including contact details such as an email address of the beneficiary, MSISDN (Mobile Station International Subscriber Directory Number)/cell phone number of the endpoint device 20 associated with the beneficiary, or the like.

In response to receiving the suitable message, the processor 24 may be configured to generate and transmit to the end point device 20, via the network 14, a suitable transfer notification message indicating that money is being transferred into or is about to be transferred into the beneficiary's financial account.

The transfer notification message may comprise information pertaining to the option of expedited clearance of the funds by the beneficiary. In particular, the transfer notification message may prompt the beneficiary for selection of expedited clearance of the funds. The transfer notification message may therefore comprise information pertaining to any fee that will be charged for expediting the clearance of the money into the beneficiary's bank account as well as suitable terms and conditions associated with such expediting of the clearance.

Should the beneficiary be desirous of expediting the clearance of the funds, they would reply to the transfer notification message, accordingly, often agreeing to the terms and conditions in doing so. Moreover, in replying, it will be understood by those skilled in the art that a suitable expedite clearance request message is generated and transmitted over the network 14 for receipt by the processor 24.

In response to receiving the expedite clearance request message, the processor 24 is therefore conveniently configured to clear the funds into the beneficiary financial account in an expedited fashion which effectively permits the funds to reflect in the beneficiary's bank account within a relatively short space of time, in real-time, or in near real-time for access by the beneficiary.

The processor 24 may clear the funds in an expedited fashion by processing the payment from the payer bank faster, by urging the stand-alone clearing system to process the payment faster, or in a substantially similar fashion as the conventional payer driven expedited payment mentioned in the "Background of the Invention" section.

The processor 24 is then also configured to deduct a service charge fee associated with the request of expedited clearance. The service charge fee may be deducted from the beneficiary's financial account and/or and the funds that is being immediately transferred into the beneficiary's financial account. In one version, the service charge fee may accumulate over a period of time (monthly, typically) and then be deducted from the beneficiary's financial account. In respect of all these deduction options, the at least one processor 24 prompts the beneficiary to specify the preferred option (or combination of options). In one version, the service charge fee may be absorbed by the financial institution associated with the beneficiary.

In one version, the at least one processor 24 prompts the beneficiary to agree to the deduction of the service charge fee (to secure the required contractual agreement with the beneficiary). In this version, the financial institution associated with the payer may be instructed by the at least one processor 24 to delay the transfer of money into the beneficiary financial account, pending confirmation from the beneficiary that the service charge fee may be deducted. Upon receiving agreement that the service charge fee may be deducted, the at least one processor 24 proceeds to clear and transfer the money into the beneficiary financial account in an expedited fashion, as defined above.

It will be understood that the messages received from or transmitted to the beneficiary endpoint computing device 20 may be in the form of USSD (Unstructured Supplementary Service Data) messages, SMS (Short Message Service) messages, notifications on a mobile software application ('app') or the like. However, in more sophisticated example embodiments of the invention, it could be via an instant message suitable software application running on their computing device 20. It will be noted that in the case of the software application being an application associated with the beneficiary's bank, the messages between the device 20 and system 10 may be routed via the bank server A 16. Notwithstanding, in the case of USSD and SMS messages, nothing precludes the system 10 routing messages to the devices 20, 22 via the servers A 16 and B 18.

Conversely, should the beneficiary not wish to expedite the receipt of the funds, they would not necessarily respond and the transaction would be cleared in the usual time frame for such transactions. Alternately, they may actively decline the expedited receipt of the funds by sending a suitable message receivable via the processor 24 over the network 14.

In one example embodiment, the transfer notification message may comprise a permission notification in the event that the beneficiary is added as a beneficiary on the payroll and/or financial account of the payor, wherein the permission notification presents the beneficiary with an option to accept or decline future clearance of all monies which the payer intends to transfer to the beneficiary in an expedited manner as described herein. For example, so as to permit the clearance of the transferred money to occur automatically on future dates on which the transfer of money will take place in an expedited manner as described herein. It will be appreciated that the permission notification may comprise of terms and conditions associated with the service for expedited clearance of the funds.

Differently states, when the payor inputs the details of the beneficiary in the payor's device 22 the payor may opt to save the details of the recipient/beneficiary as a future or frequent recipient/payee/beneficiary of the payor, wherein the beneficiary's details are stored under the banking profile of the payor which is administered by the payor bank server B 18. Upon saving the details of the beneficiary, the payor bank server B 18 may be arranged to transmit a transfer notification message comprising a permission notification to the beneficiary bank server A 16 for onward transmission to the beneficiary user device 20. The permission notification may include details such as service charges which will be automatically charged to the beneficiary for accepting to have funds/money to be immediately transferred to the beneficiary bank account from the payor's bank account in all future transfers which will be made by the payor, and also authorise the payor bank server B 22 to automatically clear all future monies which will be transferred by the payor into the beneficiary's bank account. Upon receiving the permission notification which comprises a prompt for prompting the beneficiary to either accept or decline the clearance of monies which will be transferred to the beneficiary in the future, the beneficiary may either accept or decline the permission notification, via the beneficiary device 20, and the response will be transmitted to the relevant bank servers for processing.

Figure 2:
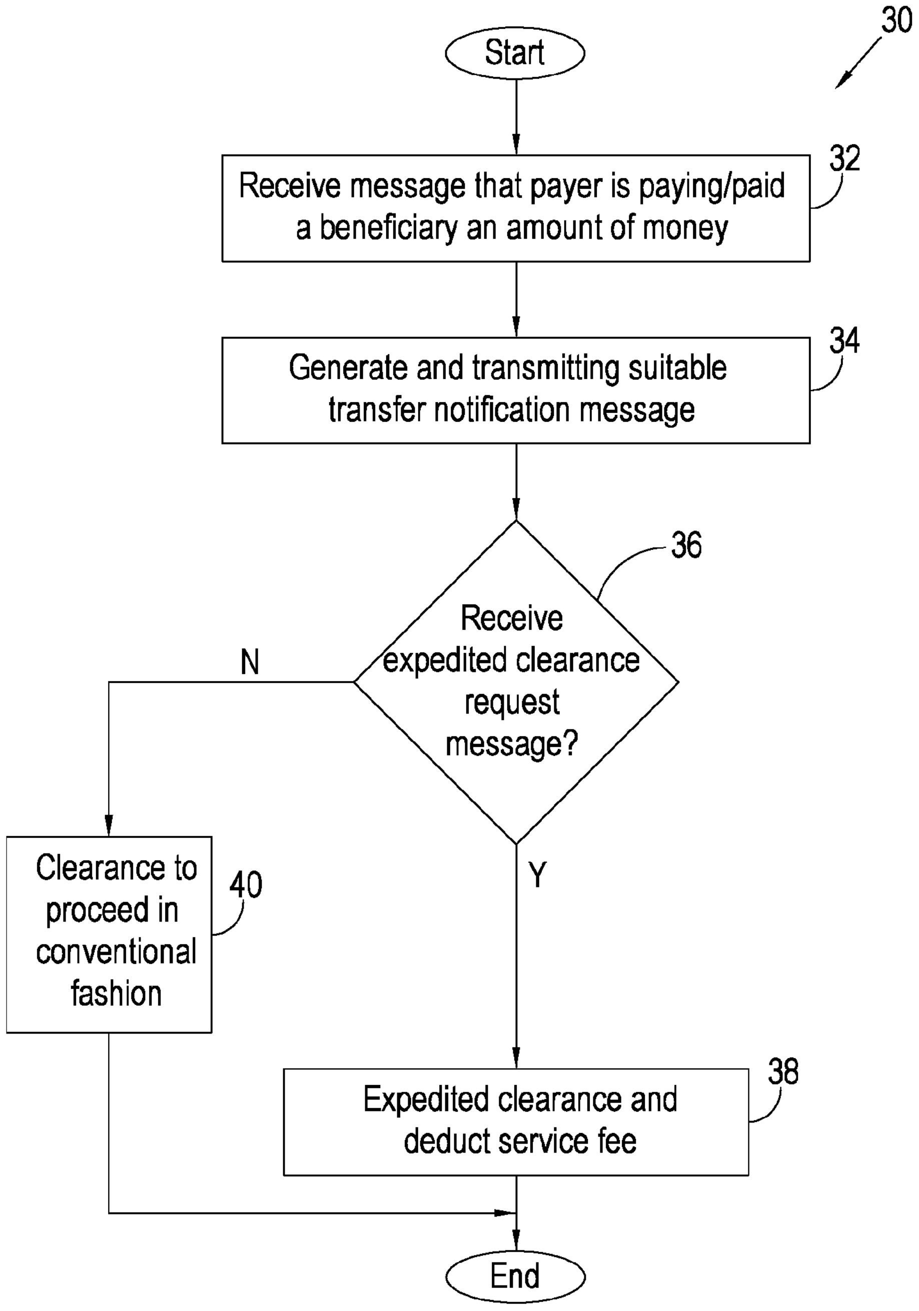
FIG. 2 shows a high-level block flow diagram of a computer-implemented method in accordance with a first example embodiment of the invention.

Referring now to FIG. 2 of the drawings where a high-level flow diagram of a method in accordance with a first example embodiment of the invention is generally indicated by reference numeral 30. It will be appreciated that the example method 30 may be implemented by systems and means not described herein. However, by way of a non-limiting example, reference will be made to the method 30 as being implemented by way of the system 10, as described above.

The method 30 is a high-level computer-implemented method of facilitating a financial transaction between a payer and payee/beneficiary, particularly the payment of funds from the payer's bank account to the beneficiary's bank account.

The method 30 comprises receiving, at block 32 by way of the processor 24, a suitable message that the payer is paying the beneficiary a sum of money, wherein the suitable message contains sufficient information to identify the beneficiary, their bank account, the quantum of the funds to be transferred as well as the name and contact details of the beneficiary. As mentioned above, the source of the message would depend on the specific example embodiment implemented but for brevity, the message is received from the bank server B 18 over the communication network 14.

In response to receiving the suitable message at block 32, the method 30 comprises generating and transmitting, at block 34 via the processor 24, a transfer notification message to the endpoint device 16 associated with the beneficiary in a manner described above, typically over the network 14. The transfer notification message effectively notified the beneficiary that money is transferred or about to be transferred into the beneficiary bank account.

As will be evident to those skilled in the art, the transfer notification message may comprise information pertaining to the transaction, particularly the transfer/payment value, the details of the payer, as well as details pertaining to the convenient option of expedited clearance driven by the beneficiary as described herein.

The transfer notification message may be arranged to prompt the beneficiary to select whether or not the money that is being transferred should be cleared immediately. Accordingly, in the event that the beneficiary opts to have the money transferred and cleared immediately, the beneficiary responds in a suitable manner which effectively generates the expedite clearance request message which is transmitted to the processor 24 via the network 14 in a manner described above.

The method 30 then includes the step of receiving, at block 36 by way of the processor 24, from the beneficiary 16, the expedite clearance request message for expediting the clearance of the money that is being transferred or about to be transferred into the beneficiary financial account.

In response to receiving the expedite clearance request message, the method 30 further comprises the step of clearing, at block 38 via the processor 24, the transferred money into the beneficiary's financial account in an expedited fashion as described above.

However, in the event that the beneficiary opts not to have the money which is being transferred being immediately transferred, there is no expedite clearance request message received at block 36 and thus the clearance proceeds in a conventional fashion at block 40. It will be appreciated that in some example embodiments, an expedited clearance decline request message for disallowing the expedited/immediate clearance of the money may be received by the processor 24 so as to allow the transfer of the money and eventual clearance thereof from the payer bank account into the beneficiary bank account to occur in a period regulated by either the payer or beneficiary banks.

Though not illustrated, the method 30 may comprise deducting, by way of the processor 24, a service charge fee associated with the request of expedited clearance from one or both of the beneficiary account and the money that is being immediately transferred into the beneficiary bank account. In this way, the beneficiary fits the bill for the expediting of the clearance.

It will be appreciated that computer-implemented method steps of receiving the transfer notification message, receiving the expedite clearance request message, receiving the expedited clearance decline request, and transferring and clearance of the money into the beneficiary bank account, may occur substantially in real time.

Figure 3:
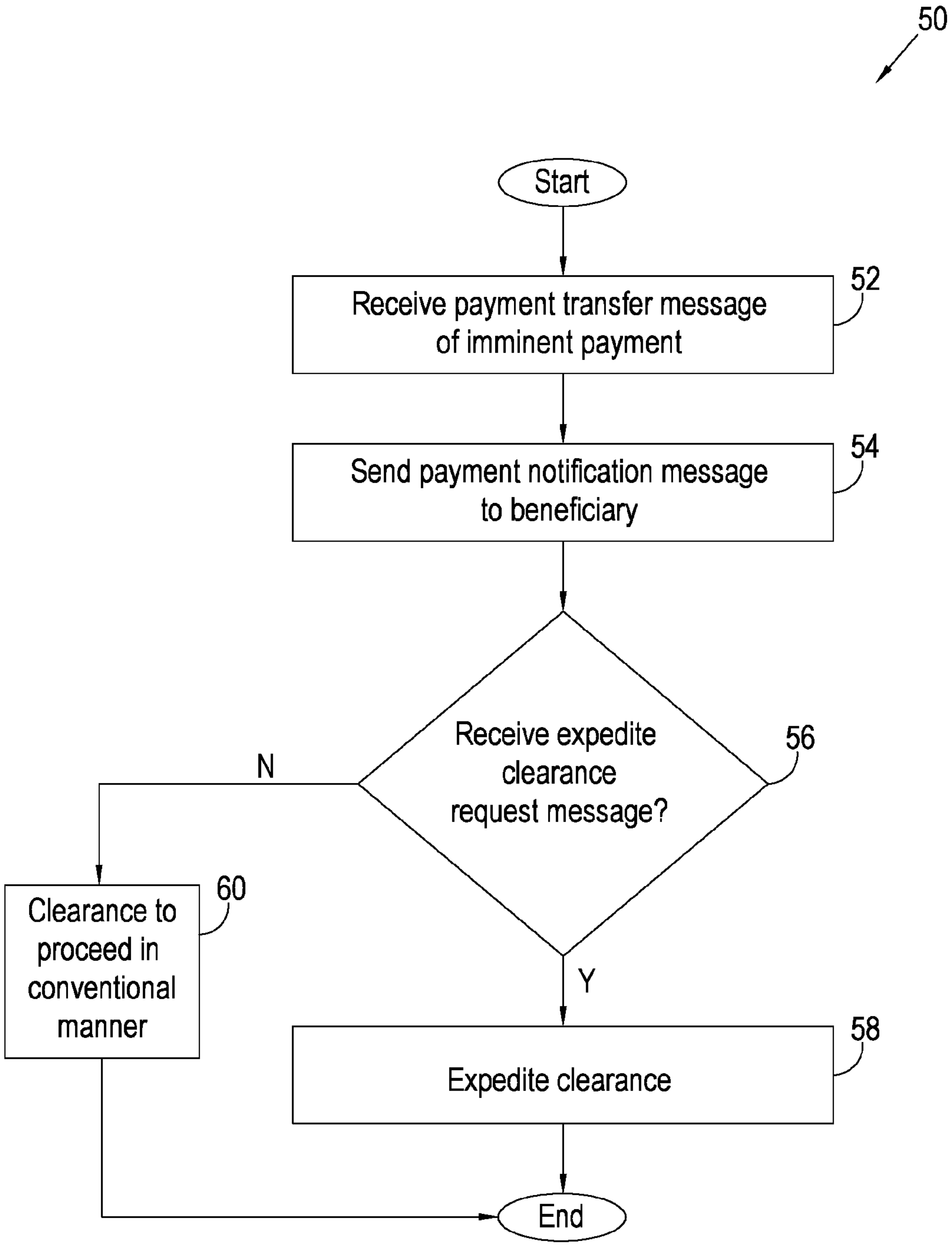
FIG. 3 shows a high-level block flow diagram of a computer-implemented method in accordance with a second example embodiment of the invention.

Referring now to FIG. 3 of the drawings where a high-level flow diagram of a method in accordance with a second example embodiment of the invention is generally indicated by reference numeral 50. It will be appreciated that the example method 50 may be implemented by systems and means not described herein. However, by way of a non-limiting example, the method 50 may be implemented by way of the system 10, as described above.

The method 50 is a high-level computer-implemented method of processing a payment to a beneficiary.

The method 50 comprises receiving, at block 52 by way of the processor 24 at a financial institution associated with the beneficiary, a payment transfer message indicating that money is being transferred into or is about to be transferred into a financial account of the beneficiary.

The method 50 then sends, at block 54, a payment notification message to the beneficiary indicating the imminent transfer of money. The payment notification message allows the beneficiary to send an expedite clearance request message to the financial institution associated with the beneficiary, for expediting the transfer and clearance of money that is being or about to be transferred into the beneficiary's financial account.

In an embodiment, the step 54 of sending the payment notification message may involve the involvement of a call centre agent to contact the beneficiary to alert him/her of the imminent transfer of money. In this case, the expedite clearance request message may take the form of a verbal confirmation by the beneficiary. In one version, this process may be managed by an interactive voice response system, with voice prompts being generated and provided to the beneficiary, who can in turn respond using the keypad of an electronic device associated with the beneficiary.

The method 50 further comprises receiving, at block 56, from the beneficiary, by the at least one processor 24, the expedite clearance request message for expediting the transfer and clearance of the money. If received, the method 50, at block 58, proceeds to clear, by the at least one processor 24, the money into the beneficiary financial account in an expedited fashion in response to receiving the expedite clearance request message. Conversely, at block 60, if the expedite clearance request message is not received, the clearance is allowed to proceed in a conventional manner.

In an embodiment, the payment notification message may comprise information pertaining to the fee that will be charged for expediting the clearance of the money into the beneficiary's bank account and associated terms and conditions.

The payment notification message may prompt the beneficiary for a selection of expedited clearance as described herein, wherein in response to a positive selection of expedited clearance from the user, the expedite clearance request message is generated and sent back to the at least one processor 24.

Though not illustrated, the method 50 comprises deducting, by the at least one processor 24, a service charge fee associated with the request of expedited clearance. As indicated above, the service charge fee may be deducted from the beneficiary's financial account and/or the money that is being immediately transferred into the beneficiary's financial account. In one version, the service charge fee may accumulate over a period of time (monthly, typically) and then be deducted from the beneficiary's financial account. In respect of all these deduction options, the at least one processor prompts the beneficiary to specify the preferred option (or combination of options).

In one version, the at least one processor prompts the beneficiary to agree to the deduction of the service charge fee (to secure the required contractual agreement with the beneficiary). In this version, upon receiving confirmation from the beneficiary that the service charge fee may be deducted, the at least one processor proceeds to clear and transfer the money into the beneficiary financial account in an expedited fashion, as defined above, or in good faith in advance of the money being received.

Figure 4:
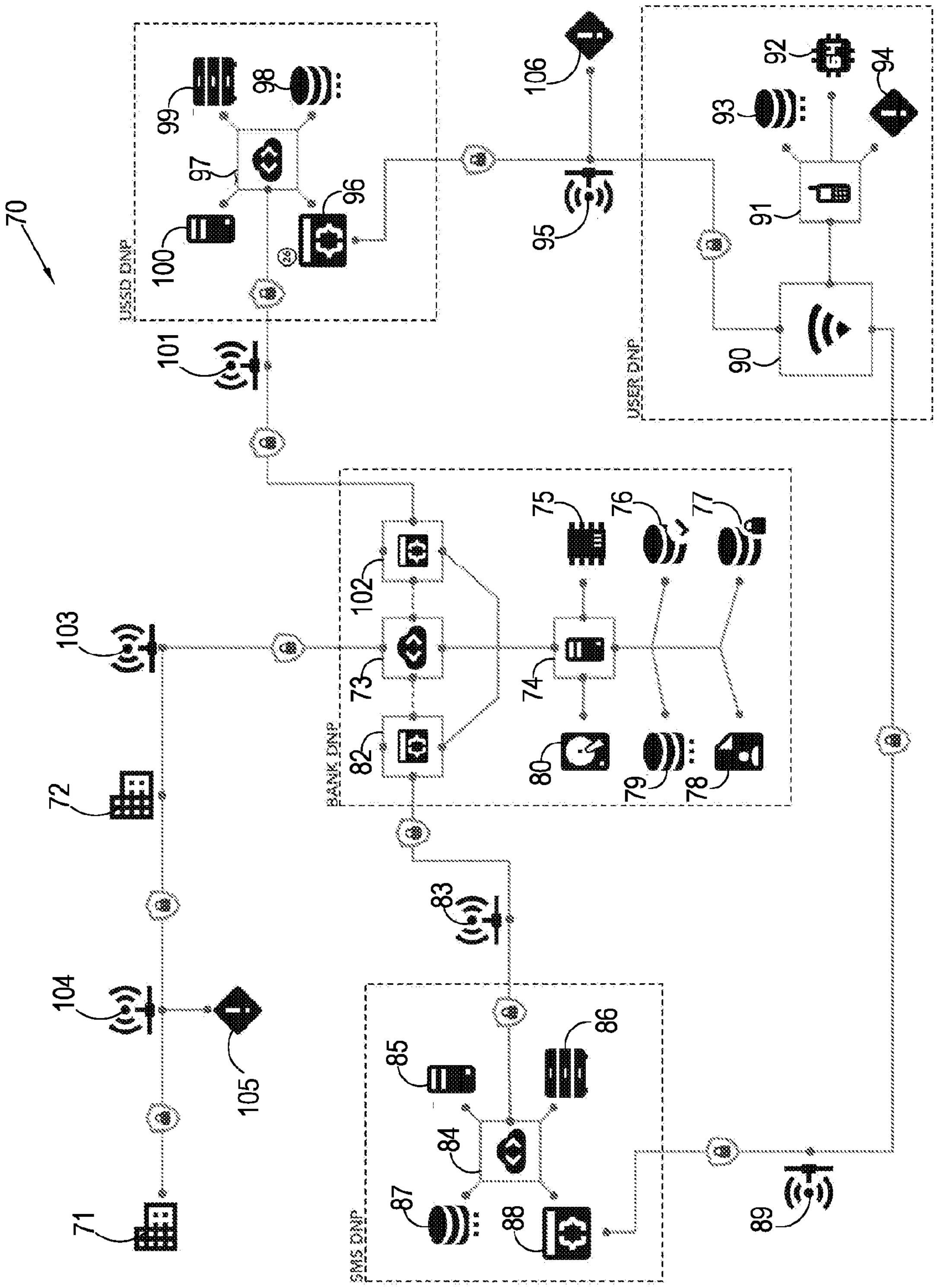
FIG. 4 shows a diagrammatic representation of building blocks and infrastructure road-map for system in accordance with the invention.

Referring now to FIG. 4 of the drawings, showing building blocks and an infrastructure road-map of the financial transaction system in accordance with the invention, the system being designated herein as reference numeral 70.

As is known in the art, DNP (Digital notification protocol) refers to a protocol that incorporates the sending of an encrypted method in part of a chain of methods to trigger a response for a two way communication within the chain itself, using any DTM available.

As is also known in the art, DTM (Digital Transportation Method) includes methods such as USSD, SMS, EMAIL, PUSH NOTIFICATION, or any other path meant for two way communication using WIFI, GSM, RFID, NFC or similar digital technologies.

In the present invention, as shown in FIG. 4, the symbol "[<->]" denotes a back and forth open channel communication using the same protocol from when it came.

Now turning our attention to the features on FIG. 4 in view of the disclosure of the present invention, Bank B 72 receives intent 73 of payment from Bank A 71 via pre-existing DNP and DTM. The intent is received as a digital notification query of intention to transfer funds via its server API 71, 104, 72, 10, 73, which triggers the server processor to action/query the datasets 79 and database 76 in search of the intended recipient 78. This search flags a Boolean 75, 73 return result 103 of whether the intended recipient is a valid account number, and issues a response to Bank A 71 on the result 72, 104. If result is false, notification is returned as false, the request is deleted, and the notification channel is closed 105. If the result is true, notification with its package parameters are stored in a temporary dataset 79, notification is returned as true 75, 74, 73, 103, 72, 104, 71 and the processor 75 triggers a New Internal Intent 75, 79, 80, 76, and the notification channel is closed 105.

The Bank A 71 has a cron job running at fast intervals to check for any stored New Internal Intent 79, 80, 76. The processor 75 executes a query 82 on the table whereby the dataset 79 gets validated for any new data, and if found, triggers the function stored in its memory to action the new intent. The processor 75 initiates a DNP and takes information stored in that intent for processing. The account number is re-verified with a SQL query, and all data and information on that dataset is returned to the DNP 82, 74, 75, 79, 76, 78.

On that return, a UUID (Universal Unique Identifier) is assigned to the process 82, and is used as a key throughout the rest of the process [i.e. data encryption]. The processor 75 uses the available notification method preferences set by the account holder 78 and initiates a transaction via relevant DTM 74, 75, 79, 76, 78, 82. The processor 75 waits on the open channel for a response and wraps each transaction segment with hash or cipher-text encryption 82 [i.e. data encryption]. The processor 75 locates a mobile number in stored data set and initiates intention to communicate via Soap Call to provider of the chosen path 74, 78, 82. The processor 75 loads DTM client and passes through the number 74, 8, 82, 83.

The DNP initiates the open call protocol to the DTM host 83, 84, 85, 86, 87, and when connection is established, pushes through the connection number 88. The DTM uses all available methods to link to the recipient, and sends through an intended notification message 88, 89, 90, 91, 92, 93. The processor 75 stores the encrypted transaction in a data set and awaits further instruction 88, 87.

The Bank 72 typically issues a notification of received funds with opt-in instructions for recipient/beneficiary to clear funds immediately at recipient's cost. The recipient/beneficiary receives notification via the DNP selected in his/her preferences. Recipient receives the notification via the DTM. This could, for example, be a SMS, push-notification in-app notification, and/or an email. Notification requests the user opt-in via USSD (for this instance, but not limited to) protocol. Recipient receives a notification via their selected DTM choice 89, 90, 91, 92, 93. Notification instructs user to opt-in on funds clearance by initiating and dialling a USSD number. SMS notification protocol and path terminated 94. Recipient initiates the transaction by dialling the USSD from his/her mobile device (in the case of USSD) 91, 92, 90, 95, 96.

The USSD DNP receives the recipients package data for verification (Package data includes MSISDN, IE, MSIE, HID, GID and other relevant identification details) 96, 97, 98, 99, 100. USSD DNP sends notification to Bank A 71 server 74 on intention of verification 102. Processor pulls data in the USSD POST info and does validation on data in the dataset stored 75, 78, 76, 79. Processor rejects USSD with return call of false using the open USSD DNP channel, if details do not match, and terminates the session 75, 74, 102, 95, 106; or the processor accepts USSD with return call of true using the open USSD DNP channel, along with notification step process 75, 74, 102, 95, 90, 91, 92, 93.

Within any of the foregoing steps:

USSD receives rejection, and displays a rejection notice to user, and terminates the session 95, 90, 91, 94; or USSD receives acceptation, and pushes the relevant notification step process to the end users handset 95, 90, 91, 92, 93.

Within the USSD loop process, internal bank verification and AML processes follow, including acceptance of a financial deduction that the recipient authorises 91, 92, 93, 90, 95, 96, 97, 101, 102, 74, 75, 76, 78. 73, 102, <->.

USSD DNP ends transaction with final notification to bank server and end user (along with bank's message of completion) that is sent from the processor, and terminates 102, 74, 75, 95, 90, 91, 92, 93, 94.

The processor receives end call from the USSD DNP and stores the received information in a dataset for later verification 73, 74, 75, 79, 76. The processor 75 informs sending bank 71 of the intention through its own DNP and DTM 73, 103, 72, 105.

Bankers lien is acknowledged and funds clearance is made, triggering processor 75 to conclude transaction 74, 73.

Processor sends notification to recipient via the preferred DTM of funds cleared, and terminates session 75, 74, 78, 82, 83, 84, 85, 86, 87, 88, 89, 90, 91, 92, 93, 94.

Bank processor 75 updates user profile, moves dataset into database for locked storage and ends transaction 78, 79, 77, 80, 74, 73, 103, 72, 104, 105.

Figure 5:
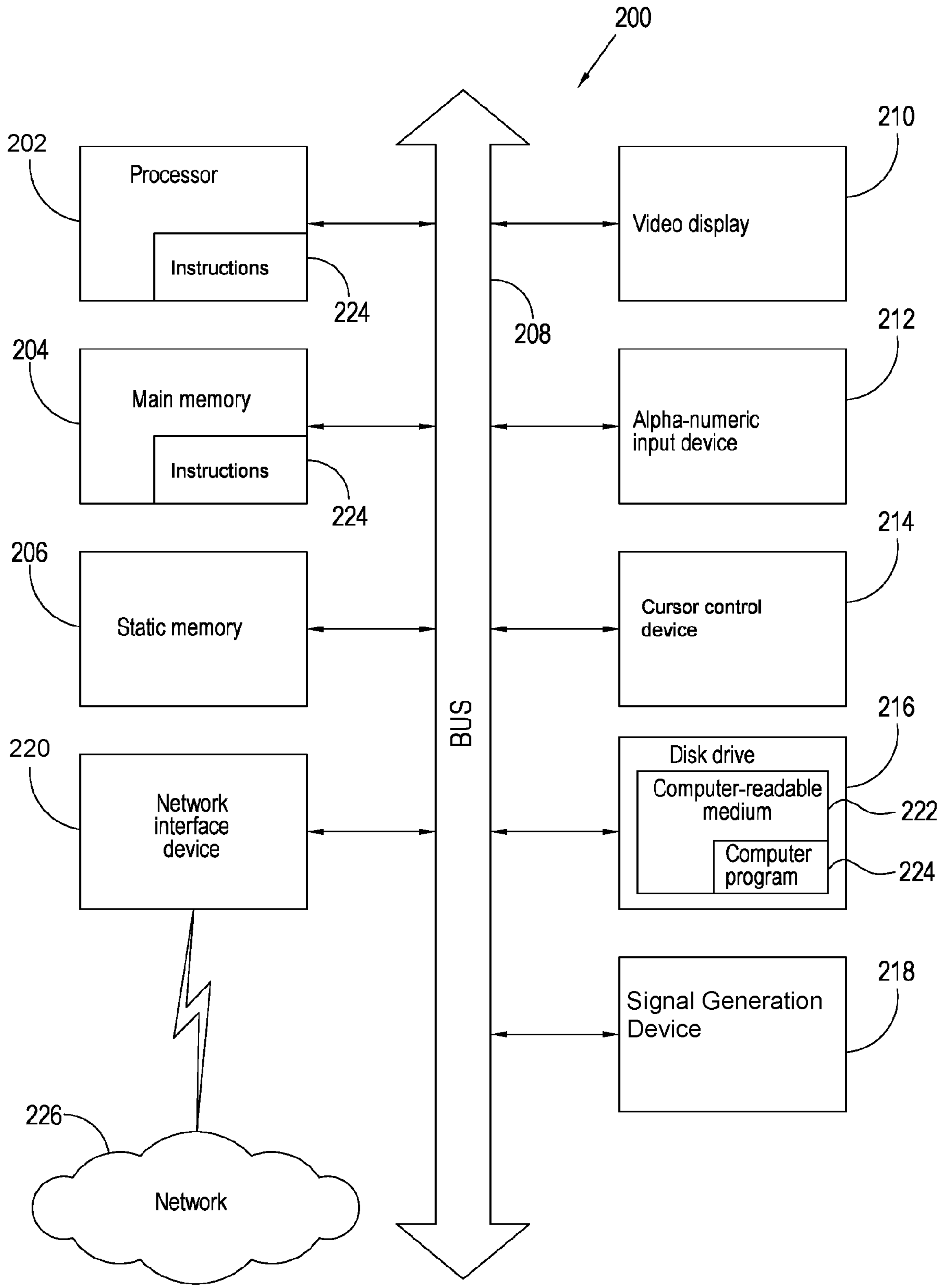
FIG. 5 shows a diagrammatic representation of a machine in the example form of a computer system in which a set of instructions for causing the machine to perform any one or more of the methodologies discussed herein, may be executed.

Referring now to FIG. 5 of the drawings which shows a diagrammatic representation of machine in the example of a computer system 200 within which a set of instructions, for causing the machine to perform any one or more of the methodologies discussed herein, may be executed. In other example embodiments, the machine operates as a standalone device or may be connected (e.g., networked) to other machines. In a networked example embodiment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated for convenience, the term "machine" shall also be taken to include any collection of machines, including virtual machines, that individually or jointly execute a set (or multiple sets) of instructions to perform any one or more of the methodologies discussed herein.

In any event, the example computer system 200 includes a processor 202 (e.g., a central processing unit (CPU), a graphics processing unit (GPU) or both), a main memory 204 and a static memory 206, which communicate with each other via a bus 208. The computer system 200 may further include a video display unit 210 (e.g., a liquid crystal display (LCD) or a cathode ray tube (CRT)). The computer system 200 also includes an alphanumeric input device 212 (e.g., a keyboard), a user interface (UI) navigation device 214 (e.g., a mouse, or touchpad), a disk drive unit 216, a signal generation device 218 (e.g., a speaker) and a network interface device 220.

The disk drive unit 216 includes a non-transitory machine-readable medium 222 storing one or more sets of instructions and data structures (e.g., software 224) embodying or utilised by any one or more of the methodologies or functions described herein. The software 224 may also reside, completely or at least partially, within the main memory 204 and/or within the processor 202 during execution thereof by the computer system 200, the main memory 204 and the processor 202 also constituting machine-readable media.

The software 224 may further be transmitted or received over a network 226 via the network interface device 220 utilising any one of a number of well-known transfer protocols (e.g., HTTP).

Although the machine-readable medium 222 is shown in an example embodiment to be a single medium, the term "machine-readable medium" may refer to a single medium or multiple medium (e.g., a centralized or distributed memory store, and/or associated caches and servers) that store the one or more sets of instructions. The term "machine-readable medium" may also be taken to include any medium that is capable of storing, encoding or carrying a set of instructions for execution by the machine and that cause the machine to perform any one or more of the methodologies of the present invention, or that is capable of storing, encoding or carrying data structures utilised by or associated with such a set of instructions. The term "machine-readable medium" may accordingly be taken to include, but not be limited to, solid-state memories, optical and magnetic media, and carrier wave signals.

The Inventors believe that the system as described herein provides a convenient alternative to facilitating expedited transfer of funds between a payer and a payee in a manner which allows more flexibility to the beneficiary. Moreover, it will be noted that though the Inventors have provided a few example embodiments of the invention described herein, the present system may co-exist with conventional payer driven expedited payment systems and may in fact piggy-back off the existing conventional structures/system which facilitate payer driven expedited payments to be able to allow a beneficiary to drive expedited receipt of funds.

The invention claimed is:

1. A computer-implemented financial transaction method between a financial account of a payer at a financial institution of the payer and a financial account of a beneficiary at a financial institution of the beneficiary, the method comprising:

receiving, over a network, by a computing device of the payer that is in communication with the financial account of the payer at the financial institution of the payer, an electronic funds payment request from the financial account of the payer to the financial account of the beneficiary;

executing, by at least one processor, a first query on stored datasets and databases, wherein the first query verifies an account number of the beneficiary and generates a boolean return result indicating account validity;

storing, responsive to a positive boolean return result, the electronic funds payment request in a temporary dataset;

executing, via a processor operating a periodic cron job at predefined intervals, a second query on the temporary dataset, wherein the second query validates the temporary dataset for newly stored data;

upon a positive validation result of the second query indicating newly stored data in the temporary dataset, assigning, via the processor, a universal unique identifier (UUID) to the newly stored data, wherein assigning the UUID comprises:

using the UUID as an encryption key for encrypting transaction segments of the electronic funds payment request;

retrieving stored notification method settings associated with the financial account of the beneficiary; and wrapping each transaction segment of the electronic funds payment request with hash or cipher-text encryption using the UUID as the encryption key;

sending, over the network, via the at least one processor to a computing device of the beneficiary that is in communication with a server associated with the financial institution of the beneficiary, a transfer notification message, wherein:

the transfer notification message is transmitted using a digital notification protocol (DNP) through a digital transportation method (DTM) selected from the stored notification method settings of the beneficiary;

the DNP initiates an open call protocol to a DTM host for transmission of the transfer notification message;

the transfer notification message indicates that electronic funds payment intended for the financial account of the beneficiary has been initiated by the payer; and the transfer notification message comprises a prompt for the beneficiary to select expedited clearance of the intended electronic funds associated with the electronic funds payment request;

verifying the beneficiary associated with the prompt by receiving beneficiary package data and validating the received package data against the stored temporary dataset;

receiving, over the network, an expedited clearance transfer message in response to a positive selection of the expedited clearance from the beneficiary after verifying the beneficiary; and in response to the expedited clearance transfer message, executing, over the network, the expedited clearance of electronic funds associated with the electronic funds payment request into the financial account of the beneficiary.

2. The method of claim 1, further comprising:

receiving, over the network from the computing device of the beneficiary, an indication of acceptance for deduction of service charge fees associated with the expedited clearance of the electronic funds; and deducting, by the at least one processor, the service charge fees from the financial account of the beneficiary.

3. The method of claim 2, wherein the transfer notification message further comprises information that prompts the beneficiary to agree to the deduction of the service charge fees; and the method further comprising delaying, by the at least one processor, the transfer of the electronic funds into the financial account of the beneficiary based on pending receipt of the indication of the acceptance from the computing device of the beneficiary.

4. The method of claim 1, wherein the transfer notification message further comprises a permission notification message that comprises a prompt for the beneficiary, the method further comprising:

receiving, using the prompt, via the computing device of the beneficiary, an acceptance of future clearances of all electronic funds which the payer intends to transfer to the financial account of the beneficiary in the future; and in response to the acceptance of the future clearances, automatically permitting the expedited clearance of the electronic funds for the future.

5. A financial transaction system, comprising:

at least one processor; and a non-transitory memory device containing instructions which when executed cause the at least one processor to:

receive, over a network, by a computing device of the payer that is in communication with a first server associated with a financial institution of the payer, an electronic funds transfer request from a financial account of the payer to a financial account of the beneficiary at a financial institution of the beneficiary;

execute a first query on stored datasets and databases, wherein the first query verifies an account number of the beneficiary and generates a boolean return result indicating account validity;

store, responsive to a positive boolean return result, the electronic funds transfer request in a temporary dataset;

execute, via a processor operating a periodic cron job at predefined intervals, a second query on the temporary dataset, wherein the second query validates the temporary dataset for newly stored data;

upon a positive validation result of the second query indicating newly stored data in the temporary dataset, assign a universal unique identifier (UUID) to the newly stored data, wherein assigning the UUID comprises:

using the UUID as an encryption key for encrypting transaction segments of the electronic funds transfer request;

retrieving stored notification method settings associated with the financial account of the beneficiary; and wrapping each transaction segment of the electronic funds transfer request with hash or cipher-text encryption using the UUID as the encryption key;

send, over the network, to a computing device of the beneficiary that is in communication with a second server associated with the financial institution of the beneficiary, a transfer notification message, wherein:

the transfer notification message is transmitted using a digital notification protocol (DNP) through a digital transportation method (DTM) selected from the stored notification method settings of the beneficiary;

the DNP initiates an open call protocol to a DTM host for transmission of the transfer notification message;

the transfer notification message indicates that electronic funds payment associated with the electronic funds transfer request intended for the financial account of the beneficiary has been initiated by the payer; and the transfer notification message comprises a prompt for the beneficiary to select expedited clearance of the intended electronic funds associated with the electronic funds transfer request;

verify the beneficiary associated with the prompt by receiving beneficiary package data and validating the received package data against the stored temporary dataset;

receive, over the network, an expedited clearance transfer message in response to a positive selection of the expedited clearance from the beneficiary after verifying the beneficiary;

in response to the expedited clearance transfer message, execute, over the network, the expedited clearance of the electronic funds into the financial account of the beneficiary.

6. The system according to claim 5, wherein the non-transitory memory device contains instructions which when executed cause the processor to:

receive, over the network, from the computing device of the beneficiary, an indication of acceptance for deduction of service charge fees associated with the expedited clearance of the electronic funds; and deduct the service charge fees from the financial account of the beneficiary.

7. The system according to claim 6, wherein the transfer notification message further comprises information that prompts the beneficiary to agree to the deduction of the service charge fees, and the non-transitory memory device contains instructions which, when executed by the at least one processor, cause the at least one processor to:

delay the transfer of the electronic funds into the financial account of the beneficiary based on pending receipt of the indication of the acceptance from the computing device of the beneficiary.

8. The system according to claim 5, wherein the transfer notification message further comprises a permission notification message that comprises a prompt for the beneficiary, the non-transitory memory device contains the instruction which, when executed by the at least one processor, further causes the at least one processor to:

receive, using the prompt, via the computing device of the beneficiary, an acceptance of future clearance of all electronic funds which the payer intends to transfer to the financial account of the beneficiary in the future; and in response to the acceptance of the future clearances, automatically permit the expedited clearance of the electronic funds into the financial account of the beneficiary in the future.

9. A non-transitory computer-readable storage device storing at least one set of computer executable instructions which when executed by at least one processor of a computer causes the computer to:

receiving, over a network, by a computing device of a payer that is in communication with a first server associated with a financial institution of the payer, an electronic funds payment request from a financial account of the payer to a financial account of the beneficiary;

executing a first query on stored datasets and databases, wherein the first query verifies an account number of the beneficiary and generates a boolean return result indicating account validity;

storing, responsive to a positive boolean return result, the electronic funds payment request in a temporary dataset;

executing, via a processor operating a periodic cron job at predefined intervals, a second query on the temporary dataset, wherein the second query validates the temporary dataset for newly stored data;

upon a positive validation result of the second query indicating newly stored data in the temporary dataset, assigning, via the processor, a universal unique identifier (UUID) to the found new data for: newly stored data, wherein assigning the UUID comprises:

using the UUID as an encryption key for encrypting transaction segments of the electronic funds payment request;

retrieving stored notification method settings associated with the financial account of the beneficiary; and wrapping each transaction segment of the electronic funds payment request with hash or cipher-text encryption using the UUID as the encryption key;

sending, over the network, via the at least one processor to a computing device of the beneficiary that is in communication with a server associated with the financial institution of the beneficiary, a transfer notification message, wherein:

the transfer notification message is transmitted using a digital notification protocol (DNP) through a digital transportation method (DTM) selected from the stored notification method settings of the beneficiary;

the DNP initiates an open call protocol to a DTM host for transmission of the transfer notification message;

the transfer notification message indicates that electronic funds payment intended for the financial account of the beneficiary has been initiated by the payer; and the transfer notification message comprises a prompt for the beneficiary to select expedited clearance of the intended electronic funds associated with the electronic funds payment request;

verifying the beneficiary associated with the prompt by receiving beneficiary package data and validating the received package data against the stored temporary dataset;

receiving an expedited clearance transfer message in response to a positive selection of the expedited clearance from the beneficiary after verifying the beneficiary; and in response to the expedited clearance transfer message, executing, over the network, the expedited clearance of electronic funds associated with the electronic funds payment request into the financial account of the beneficiary.

10. A computer-implemented beneficiary-side financial transaction method, comprising:

receiving, by at least one processor at a server of a financial institution associated with a financial account of a beneficiary or at a clearing house, a payment transfer message indicating that electronic funds are to be transferred into the financial account of the beneficiary;

executing, by the at least one processor, a first query on stored datasets and databases, wherein the first query verifies an account number of the beneficiary and generates a boolean return result indicating account validity;

storing, responsive to a positive boolean return result, the payment transfer message in a temporary dataset;

executing, via a processor operating a periodic cron job at predefined intervals, a second query on the temporary dataset, wherein the second query validates the temporary dataset for newly stored data;

upon a positive validation result of the second query indicating newly stored data in the temporary dataset, assigning, via the processor, a universal unique identifier (UUID) to the newly stored data, wherein assigning the UUID comprises:

using the UUID as an encryption key for encrypting transaction segments associated with the payment transfer message;

retrieving stored notification method settings associated with the financial account of the beneficiary; and wrapping each transaction segment associated with the payment transfer message with hash or cipher-text encryption using the UUID as the encryption key;

sending, over the network, via the at least one processor to a computing device of the beneficiary that is in communication with a server associated with the financial institution of the beneficiary, a transfer notification message, wherein:

the transfer notification message is transmitted using a digital notification protocol (DNP) through a digital transportation method (DTM) selected from the stored notification method settings of the beneficiary;

the DNP initiates an open call protocol to a DTM host for transmission of the transfer notification message;

the transfer notification message indicates that electronic funds payment intended for the financial account of the beneficiary has been initiated by the payer; and the transfer notification message comprises a prompt for the beneficiary to select expedited clearance of the intended electronic funds associated with the payment transfer message;

verifying the beneficiary associated with the prompt by receiving beneficiary package data and validating the received package data against the stored temporary dataset;

receiving, by the at least one processor, an expedited clearance transfer message in response to a positive selection of the expedited clearance from the beneficiary after verifying the beneficiary; and in response to the expedited clearance transfer message, executing, by the at least one processor, the expedited clearance of the electronic funds associated with the payment transfer message into the financial account of the beneficiary.

11. The method of claim 10, further comprising:

receiving, by the at least one processor and from the computing device of the beneficiary, an indication of acceptance for deduction of service charge fees associated with the expedited clearance of the electronic funds; and deducting, by the at least one processor, the service charge fees from the financial account of the beneficiary.

12. The method of claim 11, wherein the transfer notification message further comprises information that prompts the beneficiary to agree to the deduction of the service charge fees, and the method further comprising delaying, by the at least one processor, the transfer of the electronic funds into the financial account of the beneficiary based on pending receipt of the indication of the acceptance from the computing device of the beneficiary.

13. A payment processing system, comprising:

at least one processor; and at least one non-transitory memory device containing instructions which when executed cause the at least one processor to:

receive, at a server of a financial institution associated with a beneficiary or a clearing house, a payment transfer message indicating that electronic funds are to be transferred into a financial account of the beneficiary;

execute a first query on stored datasets and databases, wherein the first query verifies an account number of the beneficiary and generates a boolean return result indicating account validity;

store, responsive to a positive boolean return result, the payment transfer message in a temporary dataset;

execute, via a processor operating a periodic cron job at predefined intervals, a second query on the temporary dataset, wherein the second query validates the temporary dataset for newly stored data;

upon a positive validation result of the second query indicating newly stored data in the temporary dataset, assign a universal unique identifier (UUID) to the newly stored data, wherein assigning the UUID comprises:

using the UUID as an encryption key for encrypting transaction segments associated with the payment transfer message;

retrieving stored notification method settings associated with the financial account of the beneficiary; and wrapping each transaction segment associated with the payment transfer message with hash or cipher-text encryption using the UUID as the encryption key;

send, over the network, to a computing device of the beneficiary that is in communication with a second server associated with the financial institution of the beneficiary, a transfer notification message, wherein:

the transfer notification message is transmitted using a digital notification protocol (DNP) through a digital transportation method (DTM) selected from the stored notification method settings of the beneficiary;

the DNP initiates an open call protocol to a DTM host for transmission of the transfer notification message;

the transfer notification message indicates that electronic funds payment intended for the financial account of the beneficiary has been initiated by a payer; and the transfer notification message comprises a prompt for the beneficiary to select expedited clearance of the intended electronic funds associated with the payment transfer message;

verify the beneficiary associated with the prompt by receiving beneficiary package data and validating the received package data against the stored temporary dataset;

receive, from the computing device of the beneficiary, an expedited clearance transfer message in response to a positive selection of the expedited clearance from the beneficiary after verifying the beneficiary; and in response to the expedited clearance transfer message, execute the expedited clearance of the electronic funds associated with the payment transfer message into the financial account of the beneficiary.

14. A non-transitory computer-readable storage device storing at least one set of computer executable instructions which when executed by at least one processor of a computer causes the computer to:

receive, at a server of a financial institution associated with a beneficiary or a clearing house, a payment transfer message indicating that electronic funds are to be transferred into a financial account of the beneficiary;

execute a first query on stored datasets and databases, wherein the first query verifies an account number of the beneficiary and generates a boolean return result indicating account validity;

store, responsive to a positive boolean return result, the payment transfer message in a temporary dataset;

execute, via a processor operating a periodic cron job at predefined intervals, a second query on the temporary dataset, wherein the second query validates the temporary dataset for newly stored data;

upon a positive validation result of the second query indicating newly stored data in the temporary dataset, assign a universal unique identifier (UUID) to the found new data to: newly stored data, wherein assigning the UUID comprises:

using the UUID as an encryption key for encrypting transaction segments associated with the payment transfer message;

retrieving stored notification method settings associated with the financial account of the beneficiary; and wrapping each transaction segment associated with the payment transfer message with hash or cipher-text encryption using the UUID as the encryption key;

send, over the network, to computing device of the beneficiary that is in communication with a second server associated with the financial institution of the beneficiary, a transfer notification message, wherein:

the transfer notification message is transmitted using a digital notification protocol (DNP) through a digital transportation method (DTM) selected from the stored notification method settings of the beneficiary;

the DNP initiates an open call protocol to a DTM host for transmission of the transfer notification message;

the transfer notification message indicates that electronic funds payment intended for the financial account of the beneficiary has been initiated by a payer; and the transfer notification message comprises a prompt for the beneficiary to select expedited clearance of the intended electronic funds associated with the payment transfer message;

verify the beneficiary associated with the prompt by receiving beneficiary package data and validating the received package data against the stored temporary dataset;

receive, from the computing device of the beneficiary, an expedited clearance transfer message in response to a positive selection of the expedited clearance from the beneficiary after verifying the beneficiary; and in response to the expedited clearance transfer message, execute the expedited clearance of the electronic funds associated with the payment transfer message into the financial account of the beneficiary.

15. The method of claim 1, wherein the transfer notification message is generated, by the at least one processor, in response to the digital transportation method previously selected by the beneficiary.

16. The system according to claim 5, wherein the non-transitory memory device contains instructions which, when executed by the at least one processor, cause the at least one processor to generate the transfer notification message in response to the digital transportation method previously selected by the beneficiary.

17. The method of claim 10, wherein executing said expedited clearance comprises causing a stand-alone clearing system to clear the funds associated with the payment transfer request in an expedited manner.

* * * * *